United States Patent
McAuliffe et al.

[11] Patent Number: 5,113,670
[45] Date of Patent: May 19, 1992

[54] BEARING COOLING ARRANGEMENT FOR AIR CYCLE MACHINE

[75] Inventors: Christopher McAuliffe, Windsor; Paul J. Dziorny, Manchester, both of Conn.

[73] Assignee: United Technologies Corporation, Hartford, Conn.

[21] Appl. No.: 562,162

[22] Filed: Aug. 3, 1990

[51] Int. Cl.⁵ ............. F25D 9/00; F04B 17/00
[52] U.S. Cl. ................ 62/402; 417/406; 417/407
[58] Field of Search ......... 62/402; 417/406, 407

[56] References Cited

U.S. PATENT DOCUMENTS

| | | | |
|---|---|---|---|
| 3,289,436 | 12/1966 | Groves et al. | 62/402 |
| 3,302,865 | 2/1967 | Kun | 417/406 X |
| 3,428,242 | 2/1969 | Rannenberg | 62/402 X |
| 3,728,857 | 4/1973 | Nichols | 62/402 X |
| 4,127,011 | 11/1978 | Giles et al. | 62/402 |
| 4,260,339 | 4/1981 | Lofts | 417/406 |
| 4,306,755 | 12/1981 | Roberts | 308/189 |
| 4,312,191 | 1/1982 | Biagini | 62/402 |
| 4,500,143 | 2/1985 | Kervistin et al. | 384/467 |
| 4,503,683 | 3/1985 | Wieland et al. | 62/86 |
| 4,507,939 | 4/1985 | Wieland | 62/402 |
| 4,580,406 | 12/1984 | Nims | 62/87 |
| 4,786,238 | 11/1988 | Glaser et al. | 417/407 X |
| 4,927,336 | 5/1990 | Rossmann et al. | 417/407 |

Primary Examiner—Henry A. Bennet
Assistant Examiner—Christopher Kilner

[57] ABSTRACT

In air cycle machines with hydrodynamic bearings, the mass flow rate of coolant (36) passing through a series of bearings (32, 28, 30) is metered before the coolant passes through the final bearing (30). The final bearing operates at an internal pressure equivalent to that present in the region (72) into which coolant exhausts after exiting the final bearing. Since coolant in the final bearing is at the same pressure as air immediately downstream from the bearing, no rotating seal is required at the outlet of the bearing cooling flowpath.

4 Claims, 2 Drawing Sheets

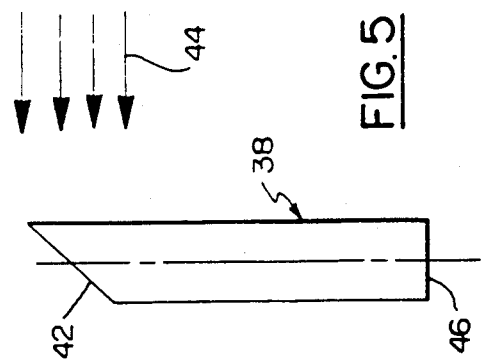
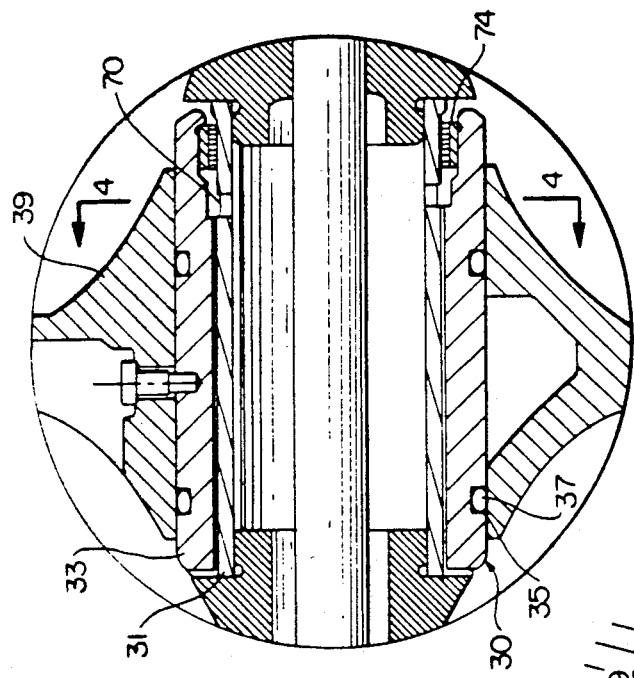
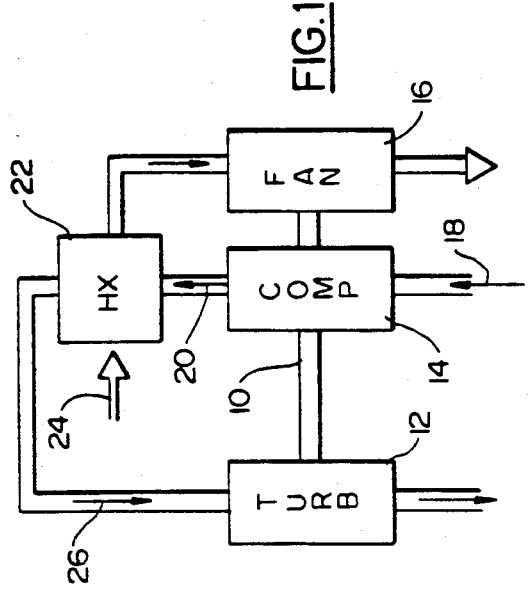
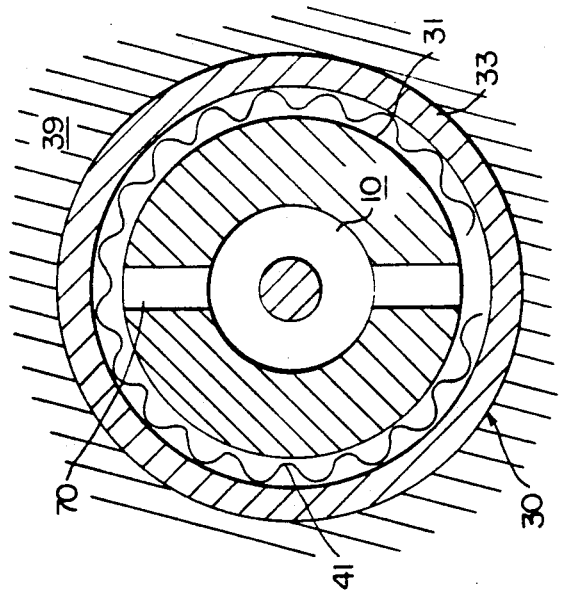

BEARING COOLING ARRANGEMENT FOR AIR CYCLE MACHINE

TECHNICAL FIELD

This invention relates to air cycle machines having hydrodynamic bearings.

BACKGROUND ART

Environmental control systems for aircraft typically employ air cycle machines and heat exchangers to cool and condition high pressure air supplied by either the engines or the auxiliary power unit. A compressor and fan in these machines are powered by a shaft connected to a turbine. The pressurized supply air passes first into the compressor. Outlet flow from the compressor, heated and further pressurized by the compression step, is chilled as it passes through the warm path of a heat exchanger. To sufficiently reduce the temperature of the air passing through the warm path, the fan draws cooler ambient air through the cooling path of the heat exchanger. Chilled air exiting the warm path of the heat exchanger is then expanded in the turbine to further cool it before it enters the aircraft cabin. Since the cabin air is maintained at a lower pressure than the supply air, properly designed systems provide conditioned air at temperatures low enough to cool both the cabin and the aircraft avionics.

To support the shaft connecting the turbine to the compressor and the fan, air cycle machines typically use three bearings. Two of these three bearings are journal bearings, and are configured to prevent the shaft from shifting radially. The third, a thrust bearing, fixes the axial orientation of the shaft. For optimum machine performance, very small clearances between the stators fixed to the machine housing and the tips of the fan and compressor blades must be maintained. Since the compressor and turbine rotors, to which the blades attach, are connected to the shaft, should the bearings allow more than slight amounts of free play, the shaft would shift when loaded and the blade tips would contact the stator surfaces encircling them.

As they offer minimal free play and reliable operation at high speed, hydrodynamic fluid film journal and thrust bearings are used to locate the shaft radially and axially, respectively. The inner race of each of these bearings connects to, or is a part of, the shaft, and the outer race of each attaches to the housing. When the shaft rotates, hydrodynamic forces are generated in fluid contained in the space between the inner and outer races of each bearing. These forces combine to yield a high pressure region in each bearing sufficient to oppose loads applied to the shaft.

To ensure that the magnitude of these hydrodynamic bearing forces remains constant during operation, the clearance between the inner and outer races must be maintained within a fairly narrow range. However, the hydrodynamic effect responsible for producing the high pressure region between the races of a rotating hydrodynamic bearing also generates heat. To minimize non-uniform thermal expansion and regulate inner race-outer race clearance, coolant is used to carry this heat away from the bearings.

U.S. Pat. No. 4,500,143 describes a roller bearing and journal assembly that employs oil and air both to regulate the clearance between inner and outer races and to lubricate the system. Cool pressurized oil circulates through passages adjacent to both the inner race of the roller bearing and the journal encircling the bearing. The flow rate of the cooling oil is selected to limit, during hot operation, the thermal expansion of the inner and outer surfaces to within a specified range. Holes drilled radially into the cooling passages at periodic intervals bleed a portion of this oil flow into the bearing chamber, directly lubricating and cooling the rollers comprising the bearing. To prevent the inner race from being overcooled to the point where the roller bearing and journal clearance increases beyond the specified range, warm air is introduced into a second passageway adjacent to the inner race. By applying air in this fashion, only the inner race expands, and the bearing-journal clearance remains sufficiently small.

In U.S. Pat. Nos. 4,503,683 and 4,507,939 a shaft supporting a turbine, compressor, and fan in an air cycle machine is axially and radially constrained by one air thrust, and and two air journal, bearings. A portion of the turbine inlet air is extracted, serving as a coolant that lubricates, cools, and supports these three bearings. A first portion of this coolant flows first into the thrust bearing cooling flowpath. A labyrinth seal at one end of the thrust bearing forces the coolant to exhaust from the other end. The slightly warmed coolant then flows directly into the inlet of the first journal bearing cooling flowpath. A labyrinth seal at the outlet of this cooling flowpath meters the mass flow rate of air passing through both the thrust and the journal bearing cooling flowpaths. This seal is critical, as flow exiting the first journal bearing cooling flowpath exhausts directly into the fan circuit. Without this facility for metering the cooling circuit flow, an excessive mass of air is extracted from the turbine inlet and wasted. Additionally, with no seal, the pressure of the coolant in both bearing flowpaths drops to the air pressure in the fan circuit, which is approximately equivalent to ambient pressure. As the density of the coolant at ambient pressure is too low to adequately support the bearings, the inner race contacts the outer race, causing excessive friction and potentially damaging wear.

A second portion of the coolant extracted from the inlet of the turbine is delivered to the second journal bearing cooling flowpath. The second journal bearing has labyrinth seals at both ends. The first of these seals allows no flow, and the second seal meters the amount of coolant allowed to flow through this second journal bearing, similar to the way the seal on the first journal bearing meters flow through the thrust and first journal bearings. The inlet to the second journal bearing flowpath is located adjacent to the first seal. Coolant therefore flows along the length of the bearing, exhausting through the second seal into the fan circuit.

Other, less relevant patents that generally relate to hydrodynamic bearing applications are U.S. Pat. Nos. 4,306,755 and 4,580,406.

DISCLOSURE OF INVENTION

Objects of the invention include improvements in hydrodynamic bearing cooling circuits.

Further objects of the invention include extracting entrained particulates from bearing coolant air prior to injection into the bearing cooling flowpath.

According to the present invention, the mass flow rate and pressure of coolant flowing through a hydrodynamic bearing cooling circuit is metered upstream of the cooling circuit.

According further to the invention, coolant circulates through an annular plenum upstream of the bearing cooling circuit, wherein the coolant velocity is reduced to cause any entrained particulate matter to drop out of the coolant flow.

In prior art systems, the flow of coolant in hydrodynamic bearing cooling circuits is throttled by a labyrinth seal, or metering holes encircling a labyrinth seal, located at the outlet of the cooling circuit. Regardless of the throttling means chosen in these systems, a labyrinth or other rotating seal must always be included at the circuit outlet to seal the space between the inner and outer bearing races and prevent excessive flow through the circuit. The pressure of the coolant flowing through the circuit is therefore maintained by properly adjusting the flow through these labyrinth seals or metering holes.

In the present invention, the mass flow rate of the coolant is metered before it enters the final bearing cooling flowpath in the circuit. The metering or throttling orifices are sized to ensure adequate, but not excessive, coolant flow through the entire circuit. Since metering is done before the final bearing cooling flowpath in the circuit, the labyrinth seal and/or metering hole arrangement at the circuit outlet, as taught in the prior art, is no longer necessary. In the present invention, therefore, pressure in this final bearing flowpath is nearly equal to the air pressure in the region receiving the exhausted coolant. The operating pressure of these bearings is critical, since a minimum coolant density is required to generate hydrodynamic forces sufficient to oppose the anticipated shaft loads. To ensure proper bearing operation, the cooling circuit outlet therefore exits into a region upstream of the compressor having pressure no lower than the minimum desired coolant pressure.

The benefits of reducing the total number of seals required to ensure proper flow through a hydrodynamic bearing cooling circuit are numerous. Since fewer parts are required to produce air cycle machines comprising these bearings, both the complexity and cost of manufacturing these machines decrease. Unlike static seals, rotating seals attempt to seal a region defined by two bodies in motion with respect to each other. Reducing the number of these seals therefore results in fewer contact and wear points, improving the overall reliability of the machine. Reducing the number of fragile labyrinth seals also reduces the risk of damaging them when the shaft is installed or removed, resulting in easier machine assembly and disassembly. Elimination of seals also allows the overall shaft length to be shortened. This both lowers the weight of the machine and increases the fundamental natural frequency of the shaft, raising the maximum speed at which the machine can be run without exciting shaft oscillations.

The foregoing and other objects, features, and advantages of the present invention will become more apparent in the light of the following detailed description of exemplary embodiments thereof, as illustrated in the accompanying drawings.

BRIEF DESCRIPTION OF DRAWINGS

FIG. 1 is schematic diagram of an air cycle machine incorporating the present invention;

FIG. 3 is an enlarged view taken along the line 3—3 in FIG. 2, showing a second gas foil journal bearing in greater detail;

FIG. 4 is a sectional view, taken on the line 4—4 in FIG. 3, showing, not to scale, a schematic end view of the second gas foil journal bearing; and FIG. 5 is a sectional view, taken on the line 5—5 in FIG. 2, showing the configuration of a flow tube that extracts coolant to supply the cooling circuit.

BEST MODE FOR CARRYING OUT THE INVENTION

Figure 2:
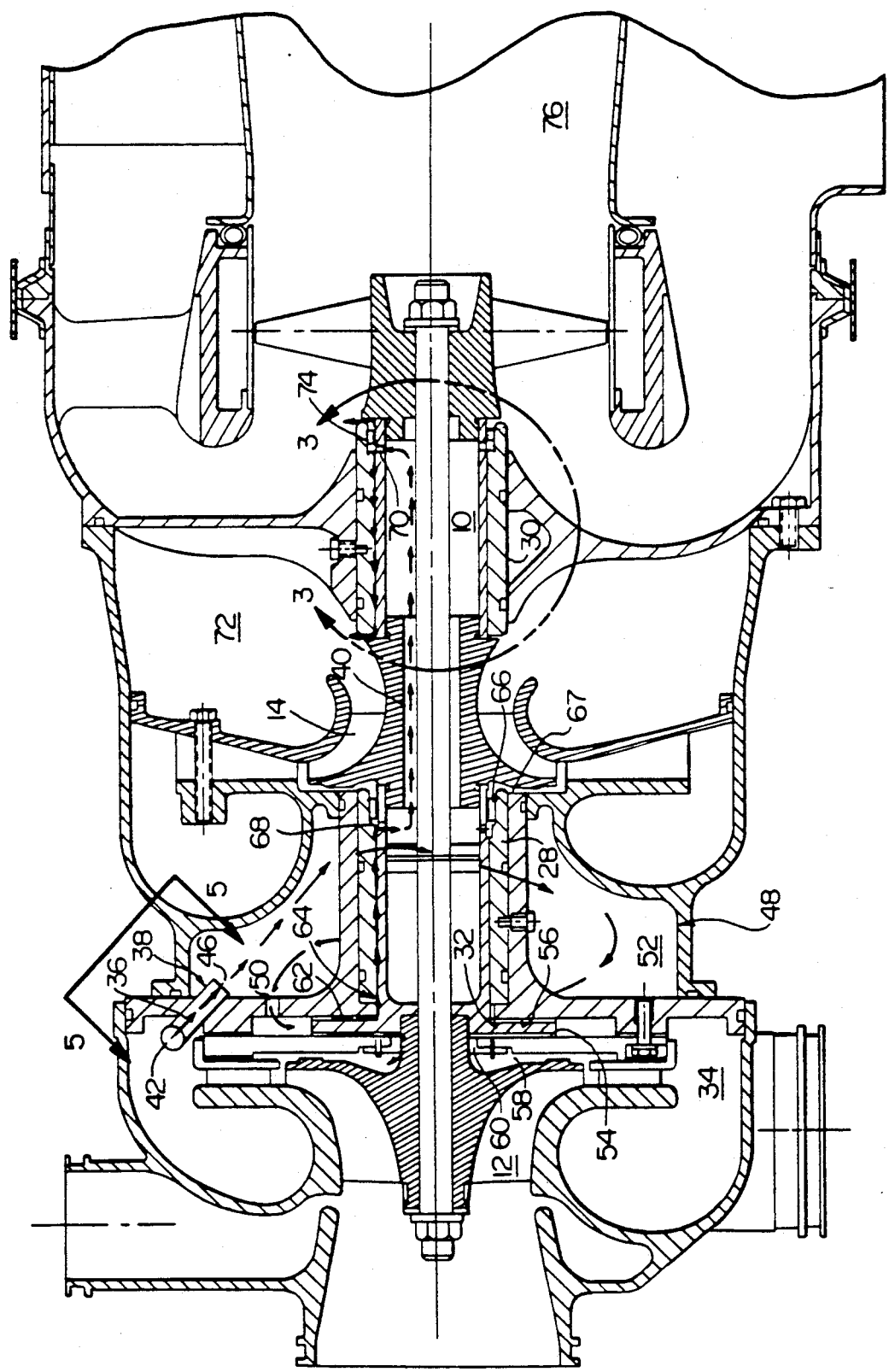
FIG. 2 is a broken away side view showing a cooling circuit for hydrodynamic bearings in the air cycle machine.

Referring now to FIG. 1, in an aircraft air cycle machine, a hollow shaft 10 connects a turbine 12, a compressor 14, and a fan 16. The compressor 14 further compresses supply air 18 delivered to the compressor inlet from either the aircraft engine compressor bleed system (not shown) or an auxiliary power unit (not shown). Outlet air 20 exiting the compressor 14, heated in the compression step, passes subsequently to the warm path of a heat exchanger 22. To lower the temperature of the outlet air 20, cooler ambient air 24 is drawn through the cooling path of the heat exchanger 22 by the fan 16. Cooled air 26 exiting the warm path of the heat exchanger 22 then passes to the turbine 12. Expanding this air 26 in the turbine 12 not only produces the power necessary to drive the compressor 14 and fan 16, but chills it as well, allowing it to be used to cool and condition the aircraft cabin (not shown).

Referring now to FIG. 2, a first hydrodynamic journal bearing 28, located between the compressor 14 and the turbine 12, and a second hydrodynamic journal bearing 30, located at the forward end of the machine between the compressor 14 and the fan 16, radially locate and support the shaft 10. A hydrodynamic thrust bearing 32, located at the aft end of the machine near the inlet of the turbine 34, ensures that proper orientation is maintained when the shaft 10 is axially loaded. Each hydrodynamic bearing 28, 30, 32 is a hydrodynamic fluid film bearing, for example a gas foil bearing comprising an inner race, an outer race, and a foil pack disposed therebetween. FIGS. 3 and 4 show expanded views of the second journal bearing 30. The inner race 31 is formed integrally with the shaft 10. The outer race 33 has groves cut into its outside surface. Compression of O-rings 35 installed in these grooves 33 against an inner surface of the housing 39 fixes the second journal bearing 30 with respect to the housing. A foil pack 41 separates the inner 31 from the outer 33 race.

The first journal bearing 28 has an inner race/outer race and foil pack configuration identical to the second journal bearing 30. Thrust bearing 32 construction is based upon similar principles, but the inner race, outer race, and foil pack are all planar disks, instead of cylindrical sleeves. When the shaft 10 rotates, hydrodynamic forces inside these gas foil bearings 28, 30, 32 combine to produce a pressurized region at the inner race-outer race interface, both driving the foil pack away from contact with the inner race and opposing any axial or radial loads tending to force the shaft 10 from its desired orientation.

Both to produce the necessary hydrodynamic pressures and to minimize axial and radial free play, during shaft rotation the inner race-outer race clearance in each bearing is small. Should this clearance increase, the hydrodynamic pressures developed may be insufficient to support the shaft 10. Should the clearance decrease, the inner race could contact the outer race, causing wear and friction. Clearance fluctuation is a concern, as developing and maintaining the pressurized region within each of these bearings generates heat which could cause the inner and outer races to expand. Coolant 36 therefore passes over the races in each bearing, controlling the thermal expansion of each component to maintain inner race-outer race clearance within some predetermined critical range.

Referring to FIG. 2, a portion of the air in the turbine inlet 34 serves as this coolant 36. Turbine inlet air is both the coolest, having passed through the heat exchanger 22, as shown in FIG. 1, and the highest pressure, air available in the system. Typically, when the machine is operated at sea level conditions, the pressure of the air in the turbine inlet 34 ranges between 40 and 50 psig (280 to 350 kPa). The pressure and density of the coolant 36 is important, since it not only cools the bearing, but lubricates and supports it as well. The greater the coolant pressure, the greater the hydrodynamic forces generated within each bearing, and the larger the loads that can be handled by the bearing. Based upon anticipated peak bearing loading, therefore, each bearing 28, 30, 32 has a critical coolant pressure which must be met or exceeded to ensure proper operation of the machine.

Referring to FIGS. 2 and 5, coolant 36 flows from the turbine inlet through a flow tube 38. The design and orientation of this flow tube 38 prevent dirt, water, and other particulates entrained in the turbine inlet air from entering and clogging the cooling circuit 40 that delivers coolant 36 to each bearing 28, 30, 32 in series. The inlet end 42 of the flow tube 38 is scarf cut and extends perpendicularly into the flow of air 44 circulating through the turbine inlet 34. The flow tube 38 is rotated such that the opening 42 formed by the scarf cut faces away from the airflow 44. With this configuration, only entrained particles able to rapidly change direction can remain in the coolant flow 36 passing through the tube 38. Since only lighter and smaller particles are able to change direction quickly enough, orienting the inlet 42 of the flow tube 38 in this fashion removes a significant percentage of the particles large enough to clog the bearing cooling circuit 40.

To further minimize the concentration of airborne contaminants, the outlet 46 of the flow tube is directed into an annular plenum 48 that separates the turbine 12 from the compressor section 14. Before entering the inlet holes 50 in the gas foil thrust bearing 32 located adjacent to the flow tube outlet 46, the coolant 36 circulates circumferentially through nearly the entire plenum 48. As the flow area of the plenum 48 is considerably greater than the flow area of the bearing cooling circuit 40, the velocity of the coolant 36 passing through the plenum 48 is very low. The coolant 36 no longer moves quickly enough to support any but the lightest and smallest particles, so most of the remaining airborne contaminants fall into a collection reservoir 52 at the lowest point in the plenum 48.

Coolant 36 enters the thrust bearing inlet hole 50 and splits at the outside edge of the inner race to flow over both the forward 56 and the aft 54 inner race surfaces. Air flowing over the aft 54 surface exhausts into a cavity at the backface of the turbine rotor 58 through a labyrinth seal 60 on the aft side of the bearing 32. To ensure adequate cooling flow through the other bearings 28, 30, the gap between the labyrinth seal 60 and the shaft 10 is sized to allow only roughly one-third of the coolant to pass over the aft surface 54 of the thrust bearing 32. The remaining two-thirds of the coolant passes over the forward inner race surface 56 before exiting through the thrust bearing outlet holes 62.

Coolant 36 leaving the thrust bearing outlet holes 62 flows directly into inlet holes 64 on the aft end of the compressor journal bearing 28, traversing forward over the length of the bearing. A labyrinth seal 66 at the forward end of the bearing 28 prevents coolant 36 from passing into a cavity at the backface of the compressor rotor 67. All coolant 36 therefore exhausts through outlet holes 68 in the inner race, passing directly into the hollow interior of the shaft 10.

Referring to FIGS. 2, 3, and 4, through the hollow interior of the shaft 10, coolant 36 flows forward from the compressor journal bearing 28 to the fan journal bearing 30. Throttle orifices 70 in the shaft wall serve as fan journal bearing inlet holes, allowing the coolant 36 to enter the fore end of that bearing. A labyrinth seal 74 at the forward end of the fan journal bearing 30 prevents coolant 36 from entering the fan circuit 76. As there is no seal at the aft end of the fan journal bearing 30, coolant 36 flows from the forward to the aft end of the bearing, exhausting directly into the compressor inlet 72.

Sizing the throttle orifices 70 so that a desired mass flow rate through then is maintained when operating at baseline conditions requires that the pressure at both the inlet and outlet of the orifices be known at these operating conditions. The inlet pressure is the pressure of coolant contained within the hollow shaft 10. As the coolant has passed through the thrust 32 and first journal bearing 28 cooling flowpaths before reaching the hollow shaft cavity, the coolant 36 pressure at the orifice inlets is typically two to three psi (15 to 20 kPa) below the turbine inlet pressure. To determine the pressure at the outlets of the orifices 70, the pressure drop across the second journal bearing cooling flowpath needed to maintain the desired mass flow rate of coolant 36 through that flowpath is calculated. The pressure at the outlet of the orifices 70 is therefore the compressor inlet pressure typically around 35 psig (240 kPa), plus the calculated pressure drop. Based on these inlet and outlet pressures, throttling orifices 70 are selected that allow the desired mass flow rate of coolant 36 to circulate through the bearing cooling circuit 40.

Although the invention has been shown and described with respect to exemplary embodiments thereof, it should be understood by those skilled in the art that various changes, omissions, and additions may be made therein and thereto, without departing from the spirit and scope of the invention.

We claim:

1. An air cycle machine comprising:
  a. an axially extending hollow shaft;
  b. a compressor mounted to a central portion of the shaft and having inlet means for receiving a pressurized fluid to be compressed therein;
  c. a turbine mounted to an first end portion of the shaft and having inlet means for receiving a pressurized fluid to be expanded therein, said turbine operatively connected to said compressor by a shaft extending therethrough whereby said compressor is driven through the shaft by said turbine;
  d. a fan mounted to a second end portion of the shaft;
  e. first hydrodynamic bearing means for supporting the shaft disposed about the shaft at a location between said compressor and said turbine;

f. second hydrodynamic bearing means for supporting the shaft disposed about the shaft at a location between said compressor and said fan; and g. a bearing cooling circuit having an inlet for receiving a portion of the compressed fluid to be expanded from the inlet means of said turbine as a coolant, an outlet for discharging said coolant directly into the inlet means of said compressor means, and a coolant flowpath therebetween traversed by said coolant, the cooling flowpath having a first portion extending from the inlet to said cooling circuit through said first hydrodynamic bearing means, a second portion extending within the hollow shaft, and a third portion extending through said second hydrodynamic bearing means to the outlet of said cooling circuit, the coolant passing in series through the first portion, thence the second portion, and thence the third portion of the cooling flowpath of said cooling circuit.

2. An air cycle machine as recited in claim 1 further comprising means for throttling the flow of said coolant through the cooling flowpath of the cooling circuit of said hydrodynamic bearing means, said flow throttling means disposed in the cooling flowpath between the second and the third portions of the cooling flowpath of said cooling circuit.

3. An air cycle machine as recited in claim 2 wherein said throttling means comprises an orifice restriction.

4. An air cycle machine as recited in claim 1 further comprising: an annular plenum having an inlet and an outlet, the plenum outlet connected in fluid communication with the inlet to said cooling circuit and the plenum inlet connected in fluid communication with the inlet means to said turbine means to receive the portion of fluid to be expanded therefrom and direct the received fluid to circulate circumferentially through said plenum at a low velocity before exiting via the plenum outlet to pass to the inlet of said cooling circuit as said coolant whereby a substantially portion of any airborne contaminants in the received fluid become separated therefrom.

* * * * *